United States Patent
Daigremont et al.

(10) Patent No.: US 7,295,846 B2
(45) Date of Patent: Nov. 13, 2007

(54) METHOD FOR LOCALIZING A MOBILE TERMINAL IN AN AREA UNDER RADIO COVERAGE OF A CELLULAR COMMUNICATION NETWORK AND OF A LOCALIZATION POINT, CORRESPONDING MOBILE TERMINAL, SERVER AND LOCALIZATION POINT

(75) Inventors: Johann Daigremont, Bagneux (FR); Claire Bazin, Paris (FR)

(73) Assignee: Alcatel, Paris (FR)

( * ) Notice: Subject to any disclaimer, the term of this patent is extended or adjusted under 35 U.S.C. 154(b) by 539 days.

(21) Appl. No.: 10/443,889

(22) Filed: May 23, 2003

(65) Prior Publication Data

US 2003/0220105 A1 Nov. 27, 2003

(30) Foreign Application Priority Data

May 24, 2002 (EP) .................................. 02360154

(51) Int. Cl.
*H04Q 7/20* (2006.01)
(52) U.S. Cl. ............................... 455/456.1; 455/552.1; 455/553.1
(58) Field of Classification Search ................ 455/436, 455/41.2, 412.1, 422.1, 456.1, 552.1, 553.1, 455/404.02, 456.5; 370/331; 709/249; 342/357.1
See application file for complete search history.

(56) References Cited

U.S. PATENT DOCUMENTS

| | | | |
|---|---|---|---|
| 5,295,180 A * | 3/1994 | Vendetti et al. | 455/456.2 |
| 6,549,773 B1 * | 4/2003 | Linden et al. | 455/426.1 |
| 6,603,977 B1 * | 8/2003 | Walsh et al. | 379/45 |
| 6,744,753 B2 * | 6/2004 | Heinonen et al. | 370/338 |
| 2002/0149515 A1 * | 10/2002 | Alanen et al. | 342/357.1 |
| 2003/0120817 A1 * | 6/2003 | Ott et al. | 709/249 |
| 2004/0106408 A1 * | 6/2004 | Beasley et al. | 455/436 |
| 2004/0202132 A1 * | 10/2004 | Heinonen et al. | 370/331 |
| 2004/0253984 A1 * | 12/2004 | Csapo et al. | 455/561 |

FOREIGN PATENT DOCUMENTS

| | | |
|---|---|---|
| DE | 3932029 A1 | 6/1990 |
| WO | WO 9519688 | 7/1995 |

* cited by examiner

*Primary Examiner*—Joseph Feild
*Assistant Examiner*—Phuoc Doan
(74) *Attorney, Agent, or Firm*—Sughrue Mion, PLLC

(57) ABSTRACT

A method for localizing a mobile terminal (13) in an area under radio coverage of a cellular communication network (12) and of a localization point (11). The method includes the steps of: transferring to the mobile terminal (13) a localization point identifier (LP-ID) of the localization point (111, . . . , 113), the mobile terminal (13) being under radio coverage of the localization point (111, . . . , 113); and transferring the localization point identifier (LP-IDs) via the cellular communication network (12) from the mobile terminal (13) to a server (123) connected to the cellular communication network (12).

8 Claims, 2 Drawing Sheets

METHOD FOR LOCALIZING A MOBILE TERMINAL IN AN AREA UNDER RADIO COVERAGE OF A CELLULAR COMMUNICATION NETWORK AND OF A LOCALIZATION POINT, CORRESPONDING MOBILE TERMINAL, SERVER AND LOCALIZATION POINT

The invention is based on a priority application EP 02 360 154.5 which is hereby incorporated by reference.

FIELD OF THE INVENTION

The present invention relates to a method for determining the position of a mobile terminal, preferably, for providing location-based services to this mobile terminal.

BACKGROUND OF THE INVENTION

In the following known methods for determining the position of a mobile terminal are described.

Known in the art is a method for determining an identifier of the cell in which a mobile terminal is currently located. This method, called Cell Id, relies on the hypothesis that the geographical coverage of a cell corresponds to that predicted by radio studies. It is possible to refine positioning using round trip delay measurements taken by the base station, which measures the time between the transmission of a frame and the reception of the corresponding answer. Using this measurement, the base station can determine the distance to the mobile with an accuracy of about 80 m. The accuracy of this positioning method is low but is compatible with the usual hardware and software of a mobile terminal. Indeed, the network measurements used by the positioning method are anyway performed when trying to establish a communication to the mobile network.

Furthermore sophisticated positioning methods use the perceived synchronization of frames sent by two adjacent base stations. Knowing the real time difference between the base stations, it is possible to retrieve the position of the terminal relatively to the base stations by performing triangulation. Such a method is known under the name OTD (Observed Time Difference). This method is efficient but requires software changes at the terminal and in the network infrastructure.

Another solution consists in integrating a GPS (Global Positioning System) receiver in the mobile terminal and relying completely on the GPS functionality to determine the position of the terminal. This solution is very accurate but requires expensive hardware modifications in the terminal. Moreover, this solution shows poor efficiency in indoor environment.

A particular object of the present invention is to provide a method for determining the position of a mobile terminal which provides a good accuracy.

Other objects of the invention are to provide a mobile terminal, a localization point and a server connected to a cellular communication network all adapted to perform several steps of this method.

SUMMARY OF THE INVENTION

These objects, and others that appear below, are achieved by a method for localizing a mobile terminal in an area under radio coverage of a cellular communication network and of a localization point belonging to a short-range non-cellular communication network, said mobile terminal comprising a first air interface to said short-range non cellular communication network and a second air interface to said cellular communication network, said method comprising the steps of:

transferring to said mobile terminal a localization point identifier of said localization point over said first air interface, when the presence of said mobile terminal has been detected at said localization point;

transferring said localization point identifier over said second air interface from said mobile terminal to a server connected to said cellular communication network.

This object is further archieved by a server connectable to a cellular communication network, said server comprising:

means for receiving a localization point identifier identifying a localization point in a short-range non-cellular communication network over an interface from said cellular radio communication network;

means for matching said localization point identifier with geographical information;

means for transmitting said geographical information or said localization point identifier identifying a localization point in a short-range non-cellular communication network over a predefined interface to an appropriate location based service server.

This object is further archieved by a localization point belonging to a short-range non-cellular communication network, wherein it comprises:

means for detecting a mobile terminal entering the zone of coverage of said localization point;

means for pushing a localization point identifier identifying itself to a mobile terminal when the presence of said mobile terminal has been detected.

According to the present invention, the mobile terminal receives from a localization point of a non-cellular communication network a localization point identifier which univocally identifies the localization point. In a second step the mobile terminal transmits this localization point identifier to a cellular communication network it is connectable to. The cellular communication network further forwards this localization point identifier to a dedicated server connectable to the cellular communication network.

In a preferred embodiment of the present invention, the dedicated server maps the localization point identifier to a geographical information.

In another preferred embodiment of the present invention, the server forwards the received localization point identifier or the geographical information obtained after mapping to an appropriate location based service server dedicated to provide a service to the mobile terminal.

The method according to the present invention presents the advantage to make a short range non-cellular communication network cooperate with a cellular communication network in order to determine the position of a mobile terminal.

An further advantageous feature of the method is that this method can be used as well outdoors as indoors since localization points of a non-cellular short range communication network may be located in buildings.

Another advantage of the present is that it enables to detect the entry of a mobile terminal in the zone of coverage of a localization point.

Further advantageous features of the invention are defined in the dependent claims.

BRIEF DESCRIPTION OF THE DRAWINGS

Other characteristics and advantages of the invention will appear on reading the following description of a preferred embodiment given by way of non-limiting illustrations, and from the accompanying drawings, in which.

DETAILED DESCRIPTION OF THE INVENTION

Figure 1:
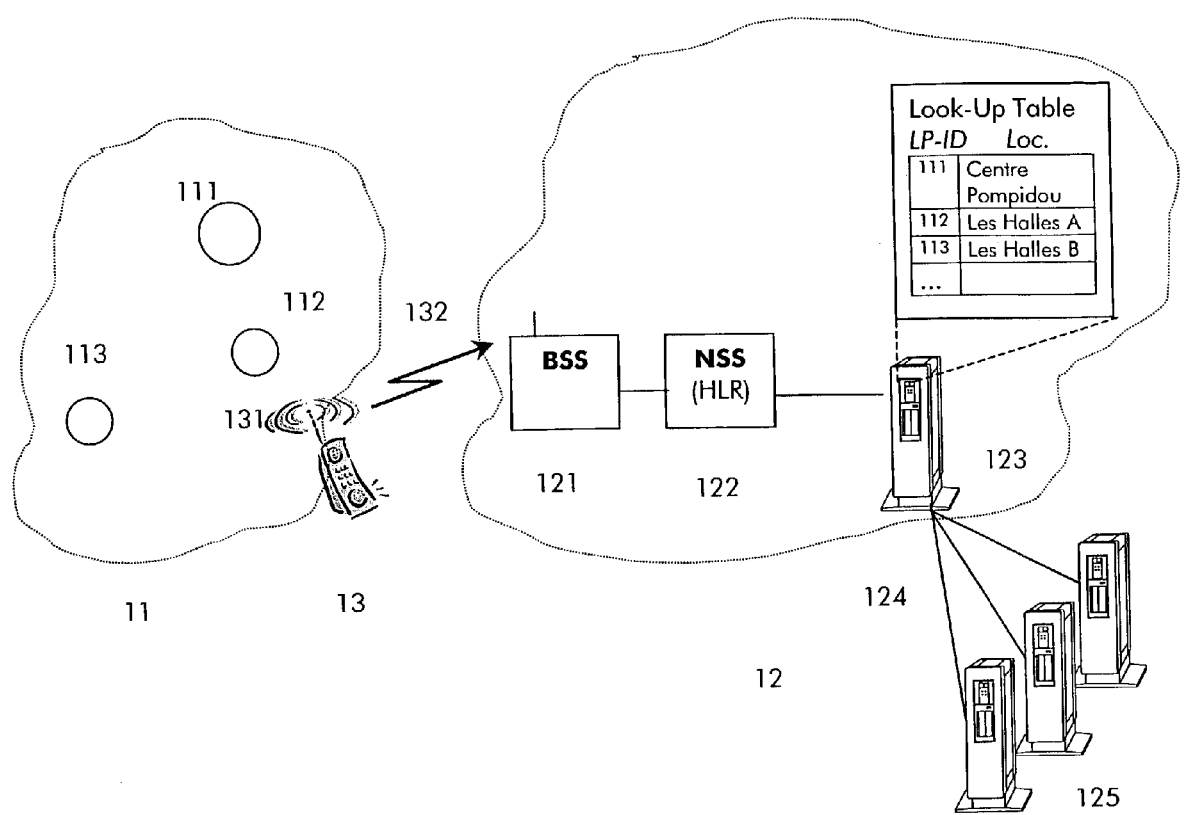
FIG. 1 shows a radio communication system where the method according to the present invention can be implemented.

FIG. 1 shows a radio communication system where the method according to the present invention can be implemented. The radio communication system comprises a first non-cellular communication network 11 a second cellular communication network 12 and a mobile terminal 13 able to connect both to a localization point 111, ..., 113 and to cellular communication network 12.

Localization points 111, ..., 113 preferably form a non-cellular communication network 11 and act as the non-cellular communication network entry points. In another embodiment of the present invention, localization points may be purely stand alone devices.

Each localization point is associated univocally a localization point identifier. Non-cellular communication network 11 may be based on Bluetooth technology or on any short range communication network as (IrDa, wireless LAN according to 802.11 specification ...).

The term localization point refers to devices which position is continuously precisely known without requesting the help of the cellular network for acquiring this knowledge. Either the localization points themselves are storing their position or a central entity e.g. server 123 does. Such devices may be fixed stations of a communication network (for example usual access points of a non cellular communication network) which have their fixed position stored inside or mobile devices for example equipped with a GPS system.

Cellular communication network 12 is preferably belonging to the group of GSM/GPRS/EDGE/UMTS networks and comprises at least a base station sub-system 121 and a core network with a home location register 122 and a server 123 according to the present invention.

Mobile terminal 13 should be connectable over a first air interface 131 to a localization point 111, ..., 113 of non-cellular communication network 11 and over a second air interface 132 to base station sub system 121 of cellular communication network 12.

Server 123 is connected to HLR 122. The MAP (Mobile Application Part protocol) is preferably used for communicating between HLR 122 and server 123.

Server 123 further comprises a lookup table associating univocally localization point identifiers with a geographical information. Geographical information may be coordinates of the position as as well a logical geographical information as for example the designation of a place (e.g. floor number in a building, train station name ...).

Server 123 is connectable over an interface 124 to servers 125 for location-based services. Server 123 is responsible for determining the position of a mobile terminal and forwarding the information to one appropriate location-based service server 125 which will provide the mobile terminal with an appropriate service.

A predefined, preferably standardized communication protocol is used on interface 124. In a preferred embodiment of the present invention, interface 124 between server 123 and servers 125 is an OSA (open service access) API as specified in 3GPP TS 29.198-family "Open Service Access; Application Programming Interface (API)". According to the present invention, the OSA API is modified to present a data structure with an attribute defining a string type reserved for localization point identifiers as well as for a logical geographical information. This presents the advantage of forwarding the localization point identifier instead of the complete geographical coordinates contrary to existing API format. In a preferred embodiment of the present invention, a timestamp or a user identifier may be transmitted together with the localization point identifier or the logical geographical information.

In the following, the different steps of the method according to the present invention will be explained in more details.

Figure 2:
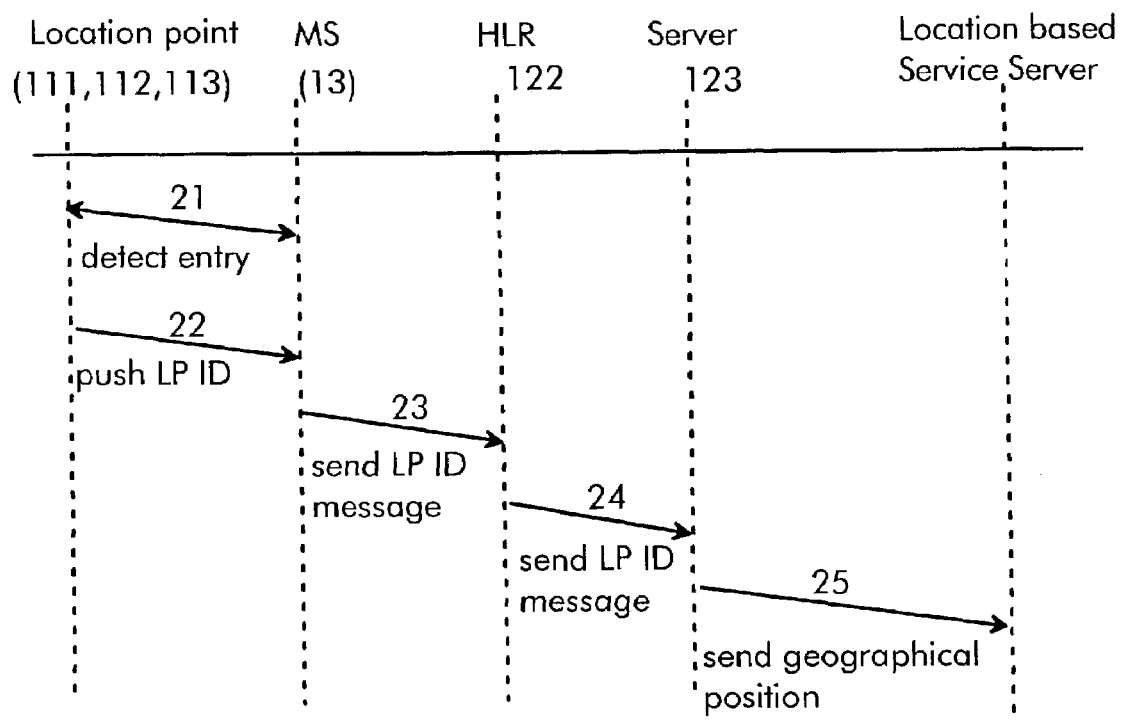
FIG. 2 shows a diagram representing the different steps of the method according to the present invention.

FIG. 2 shows a diagram representing the different steps of the method according to the present invention.

Step 21 consists in detecting by one or more localization points in the non-cellular communication network the presence of a mobile terminal. Preferably, each localization point broadcasts at regular time interval a message directed to mobile terminals entering a predefined zone around the localization point.

Step 22 consists in sending a message from a localization point which has detected the presence of a mobile terminal to the mobile terminal, the message containing a localization point identifier identifying univocally the localization point.

Step 23 consists, at the mobile terminal, in sending a localization point identifier, received over interface 131 from the non-cellular communication network, to the cellular communication network over interface 132. In a preferred embodiment of the present invention, the localization point identifier received over interface 131 is encapsulated in a SMS (Short message Service) or USSD (Unstructured Supplementary Service Data) message and transmitted over air interface 132 towards cellular communication network 12. USSD is a communication protocol described in GSM 02.90—"Digital Cellular telecommunications system; Unstructured Supplementary Service Data (USSD)", ETSI. USSD messages present the advantage to be to up seven time faster than SMS messages. This is especially advantageous for rapidly moving mobile terminal which require very quickly a location-based service.

Preferably, if USSD messages are used, the localization point identifier is forwarded to Home Location Register 122.

Step 24 consists in forwarding the localization point identifier to a server 123 responsible for mapping localization point identifiers to geographical information. For this purpose, server 123 comprises a look up table univocally associating a localization point identifier to a geographical information. Server 123 may be a usual server connected to the core network of cellular communication network 12 over a predefined MAP interface.

Step 25 consists in forwarding the geographical information of the mobile terminal or its localization point id if the mapping has not already been performed during step 24 at server 123 to an appropriate location-based service server 125. The geographical information or the localization point identifier is possibly transmitted together with an identifier of mobile terminal 13. Other information as for example the timestamp, are also transmitted together with the geographical information or with the localization point identifier.

If several location-based services servers are addressable by server 123, they may form a data network having an interface to server 123. Examples for location-based services are well known to person skilled in the art. The type of location-based services as well as the implementation of such services are not part of this invention. This invention may be used whatever the chosen location-based service and whatever its implementation. In a preferred embodiment of the present invention, the interface 124 between server 123 and server 125 is an OSA (open service access) API interface as specified in 3GPP TS 29.198-family "Open Service Access; Application Programming Interface (API)". The OSA API has a data structure with an attribute defining a string type reserved for localization point identifiers or for logical geographical information.

Figure 3:
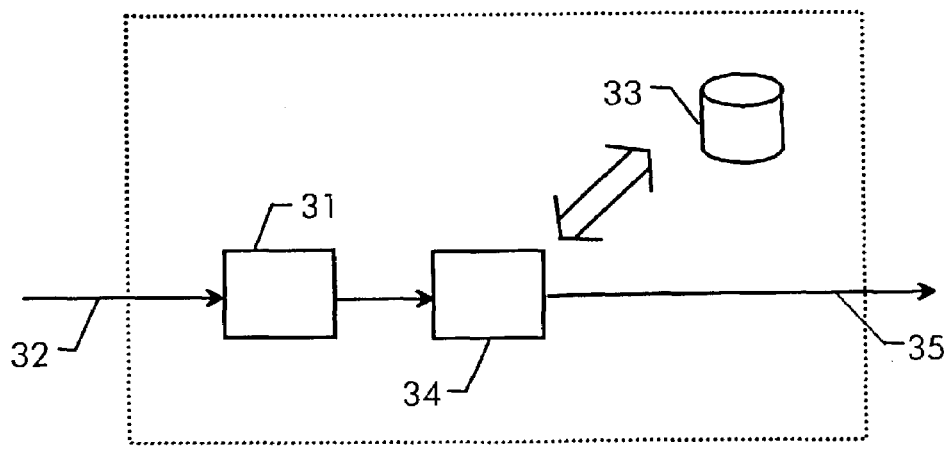
FIG. 3 shows an implementation of the server performing the mapping between localization points identifiers and geographical information according to the present invention.

FIG. 3 shows an embodiment of server 123 for converting a localization point identifier to a geographical information according to the present invention.

The server for converting a localization point identifier according to the present invention comprises means 31 for receiving a localization point identifier over a predefined communication interface 32. The server further comprises a lookup table 33 for associating a list of localization point identifiers to a list of geographical information, means 34 for determining a geographical information and a communication interface 35 for forwarding the determined geographical information to a location-based service. Means 31 for receiving a localization point identifier are connected to means 34 for determining a geographical information themselves connected to lookup table 33. Means 34 for determining a geographical information are further connected to communication interface 35.

Lookup table 33 is a database populated with information from the different available localization points.

Upon reception of a localization point identifier at receiving means 31, localization point identifier is forwarded to means 34 for determining a geographical information. Means 34 in turn start a query at lookup table 33 which returns as result a geographical information.

In a preferred embodiment of the present invention, the geographical information is then transmitted over communication interface 35, preferably over a OSA API, to a location based service server 125 which in turn will provide an appropriate service to mobile terminal 13.

The invention claimed is:

1. A method for localizing a mobile terminal in an area under radio coverage of a cellular communication network and of a localization point belonging to a short-range non-cellular communication network, said mobile terminal comprising a first air interface to said short-range non cellular communication network and a second air interface to said cellular communication network, wherein said method comprises:

transferring a localization point identifier of said localization point to said mobile terminal over said first air interface when the presence of said mobile terminal has been detected at said localization point; and transferring said localization point identifier from said mobile terminal over said second air interface to a server connected to said cellular communication network.

2. The method according to claim 1, wherein the method further comprises detecting, at a localization point, when said mobile terminal enters a zone of coverage of said localization point.

3. The method according to claim 1, wherein said localization point identifier is encapsulated in an Unstructured Supplementary Service Data message for transmission from said mobile terminal to said cellular communication network over said second air interface.

4. The method according to claim 1, wherein the method further comprises matching, at said server, said localization point identifier with geographical information.

5. The method according to claim 1, wherein the method further comprises transmitting, from said server, said geographical information or said localization point identifier to an appropriate location based service server.

6. The method according to claim 5, wherein said geographical information or said localization point identifier are passed between said server and said location based service server via an interface having a data structure with an attribute defining a string type data field which is reserved for said geographical information or for said localization point identifier.

7. The method according to claim 1, wherein said cellular communication network is selected from the group consisting of GSM, GPRS, EDGE, and UMTS communication network.

8. A server connectable to a cellular communication network, said server compnsing:

means for receiving a localization point identifier identifying a localization point in a short-range non-cellular communication network, said localization point identifier being received from an air interface to said cellular radio communication network;

means for matching said localization point identifier with geographical information; and means for transmitting said geographical information or said localization point identifier identifying a localization point in a short-range non-cellular communication network over a predefined interface to an appropriate location based service server.

* * * * *